Figure 1:
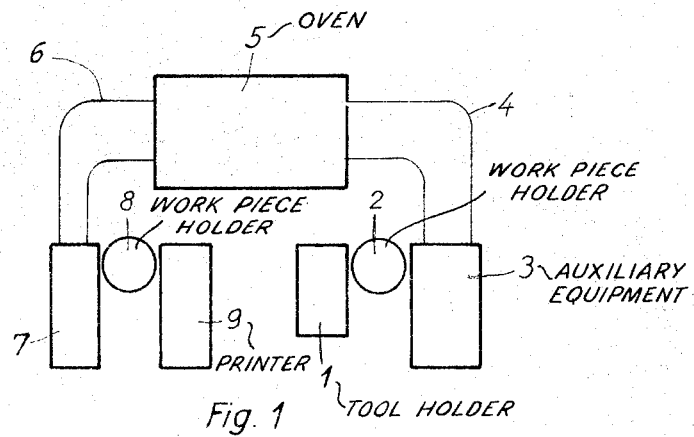

Nov. 8, 1966  K. G. HINTERKOPF  3,283,739
AUTOMATIC CAN COATING APPARATUS
Filed Sept. 10, 1962  7 Sheets-Sheet 1

INVENTOR
Kurt G. Hinterkopf

BY
Bailey, Stephens & Huettig
ATTORNEYS

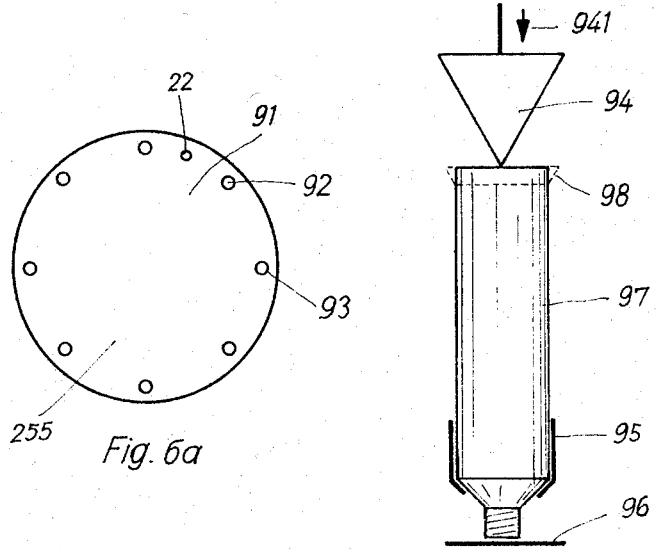
Fig. 6a
Fig. 3a
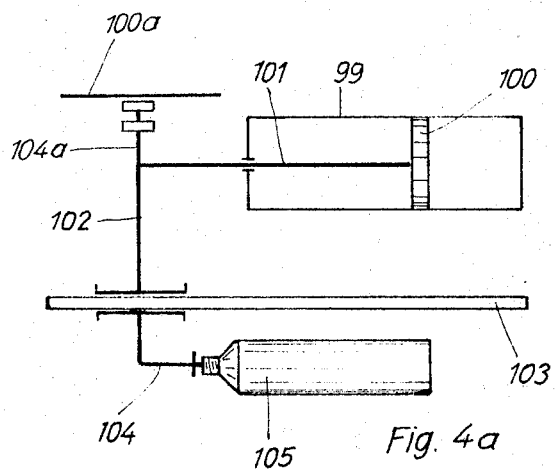
Fig. 4a

INVENTOR
Kurt G. Hinterkopf

BY Bailey, Stephens & Huettig
ATTORNEYS

United States Patent Office 3,283,739
Patented Nov. 8, 1966

3,283,739
AUTOMATIC CAN COATING APPARATUS
Kurt G. Hinterkopf, Scharnhorststrasse 21,
Eislingen (Fils), Germany
Filed Sept. 10, 1962, Ser. No. 222,395
Claims priority, application Germany, Sept. 13, 1961,
H 43,652
19 Claims. (Cl. 118—1)

The invention relates to a processing plant and more especially to an apparatus for the blemish-free or non-cutting treatment of work-pieces in continuous flow, for example, for the printing, varnishing or labelling of tubes, sleeves, shells, cans and the like. The apparatus includes at least a processing station for the transfer of a fluid or paste-like mass to the peripheral surface of the work-piece to be processed, for example a printing, varnishing or labelling operation for the transfer of ink, varnish or an adhesive substance, and a work-piece holding head constructed in the form of a rotatable head, carrying simultaneously at its periphery distributed work-pieces and leading these forward in discrete change-over steps one after the other to the processing position and there offering the work pieces to a tool attached to an alternatively forwardly or reverse moving tool-holder. It further includes in a preferred form a conveyor device constructed as a conveyor belt or conveyor chain and serving for the transport of the work-piece from the coating position to a following, auxiliary post-coating position, for example a drying oven.

It is the main object of the invention to provide an apparatus of the aforesaid character in which the work-piece holding head is connected (is necessary together with the drive for the conveyor device associated with it) to an associated individual electric driving motor with the drive for the change-over movement of the tool holder through, for example, an electro-magnetic, mechanical or hydraulic or pneumatic coupling or another connecting element to interrupt the power flow at a predetermined time. This connecting member is actuated by a feeler member of a preferably electrical control device, for example through a control relay or a pressure air cylinder, which feeler member examines the work-piece for the correct position in its holding head, and preferably consists of an electrical contact member, an optical-electrical light feeler or a pneumatic feeler, and thus is engaged or disengaged automatically according to the measurement of the impulse which is generated by the control device in dependence upon whether the holder under consideration shortly before the arrival at the processing position contains a work-piece and whether this work-piece has taken up in its holder the correct working position.

Another object of the invention is to provide an apparatus in which the work-piece holding head is driven directly by the driving motor, while the drive for the tool-holder, in contrast to the known arrangements, is transmitted from the drive of the work-piece holding head through a coupling, the engaging and disengaging movements of which are controlled by the control device which examines and controls the correctness of the working position of the work-piece on the work-piece holding head to be processed.

A further object of the invention is to provide an apparatus of the general character described in which, if one of the mounting spindles of the work-piece holding head carries no tube or can, the work-piece holding head need not be displaced laterally as in similar known devices, but instead the coupling interposed in the drive is disengaged so that the tool-holder remains at a standstill after lying idle for a short rest period of exactly predetermined length until the interruption is overcome.

A still further object of the invention is to provide an apparatus of the general character above mentioned the employment of which reduces the disadvantages of the known fully automatic machines and makes the above division of the driving power possible and, thus, so to complete the known devices with semi-automatic drive with the help of auxiliary apparatus constructed in accordance with the invention, the initial costs of which are very much smaller, that they can now also be driven fully automatically. The new auxiliary apparatus permits the hitherto known devices with semi-automatic drive to be arranged for fully automatic drive with considerably smaller costs.

These and other objects, features, and advantages of the present invention will become further apparent from the following detailed description thereof.

Figure 1B:
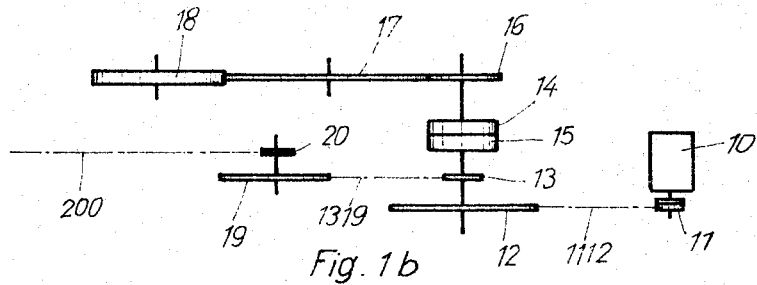
Figure 6:
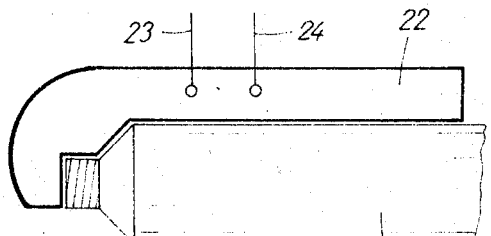
Figure 1A:
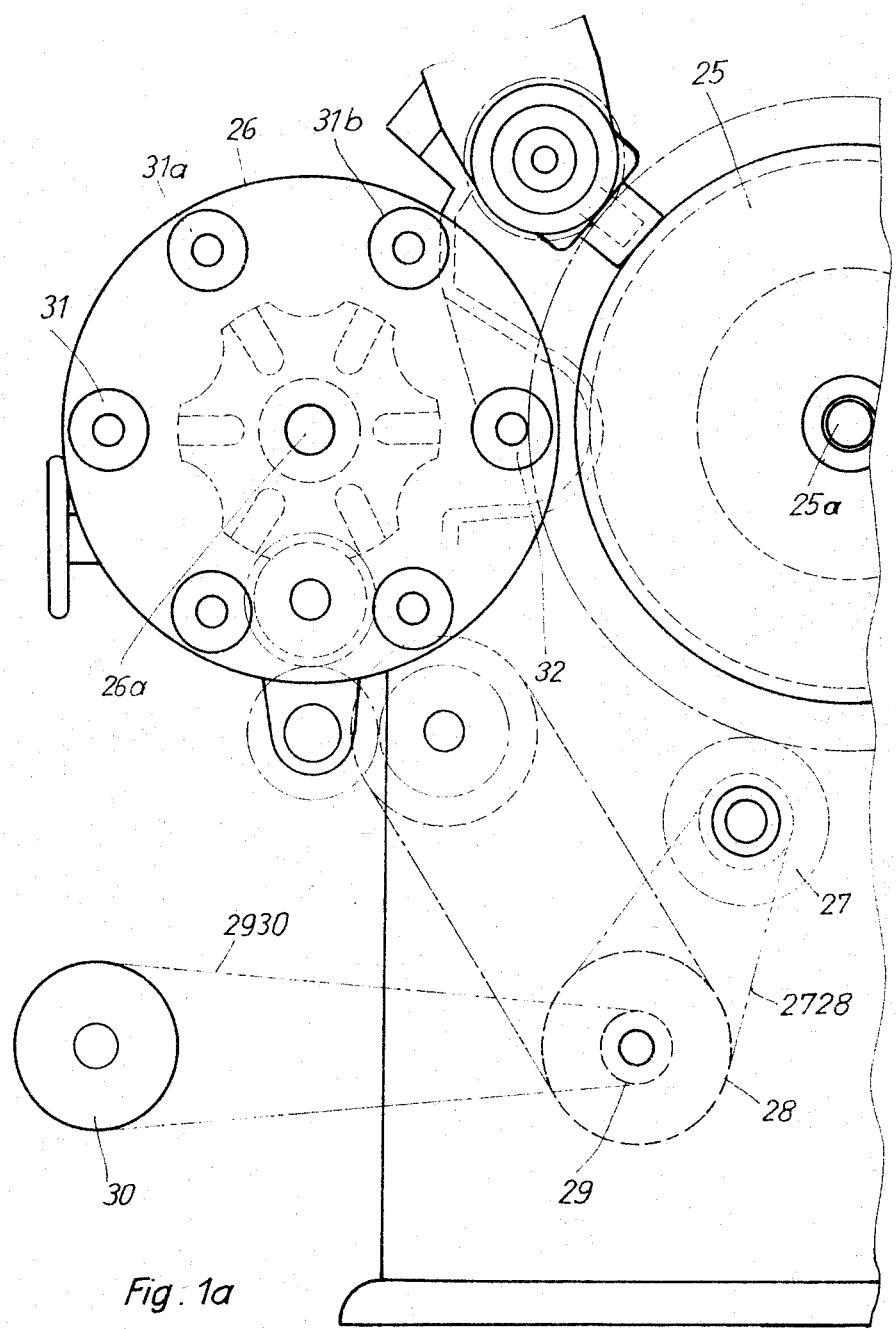
Figure 3:
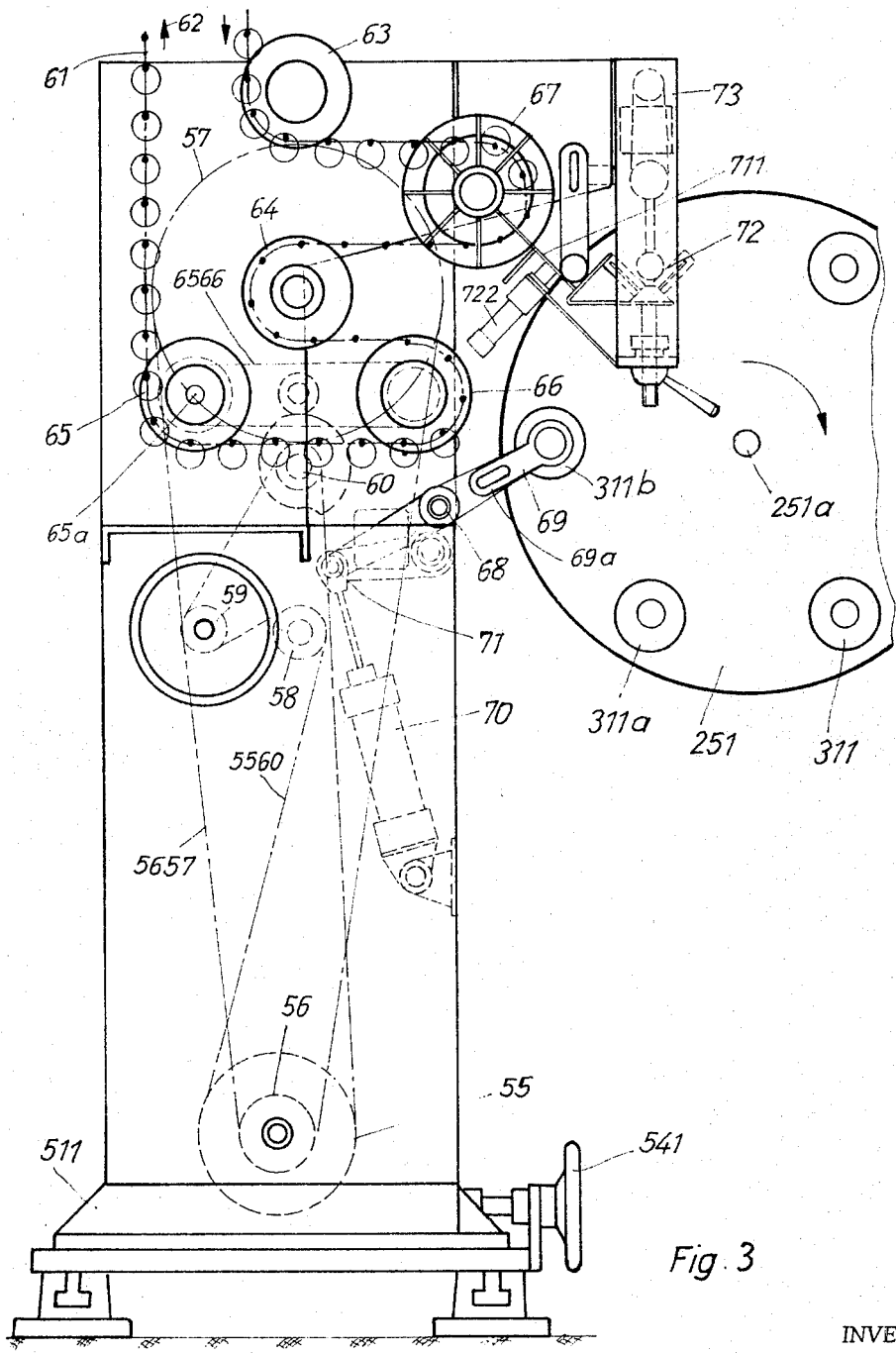
Figure 2:
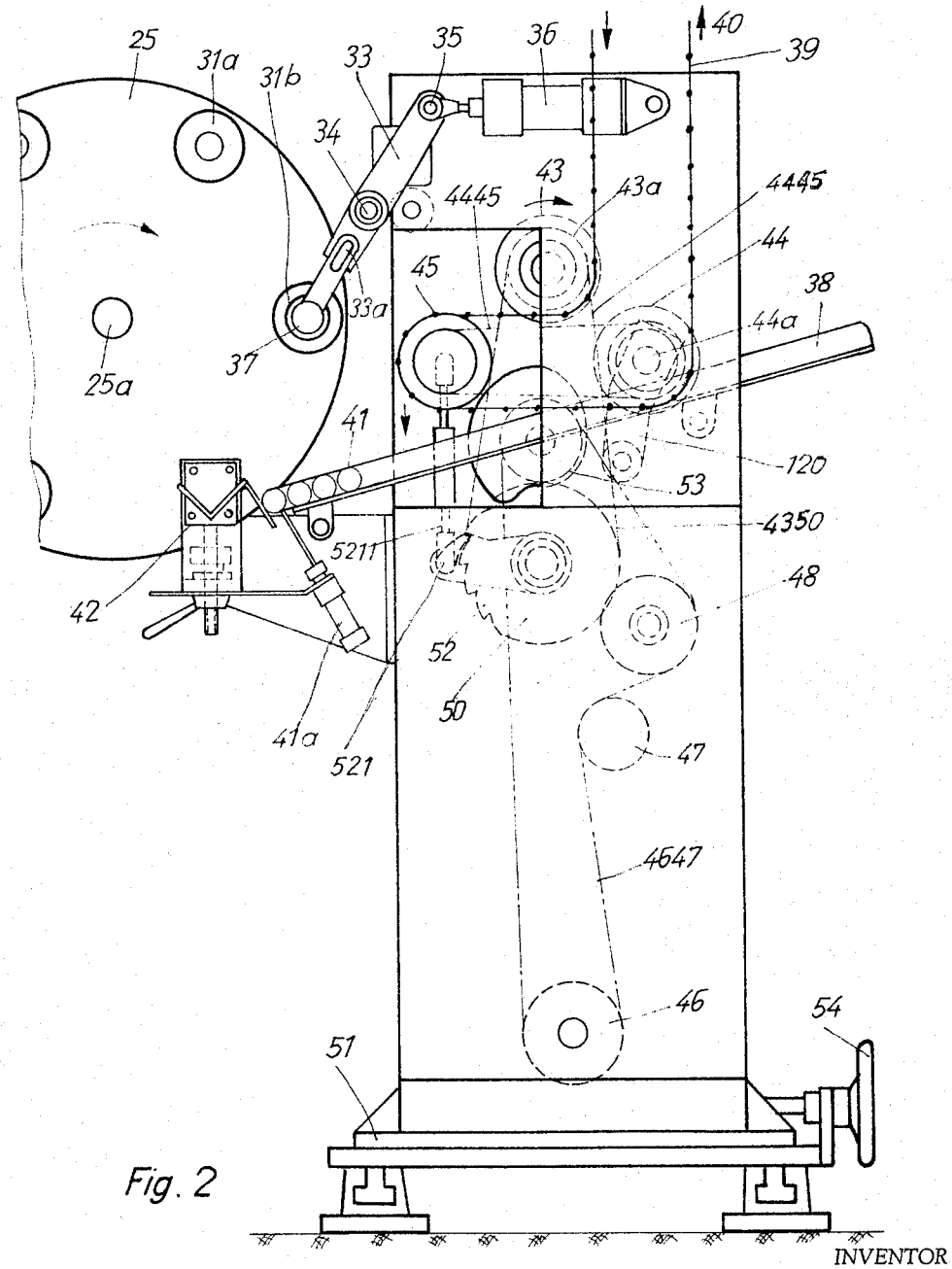
Figure 4:
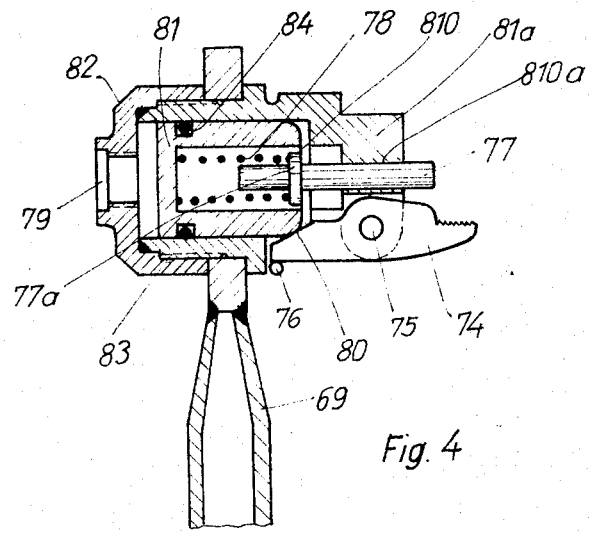
Figure 5:
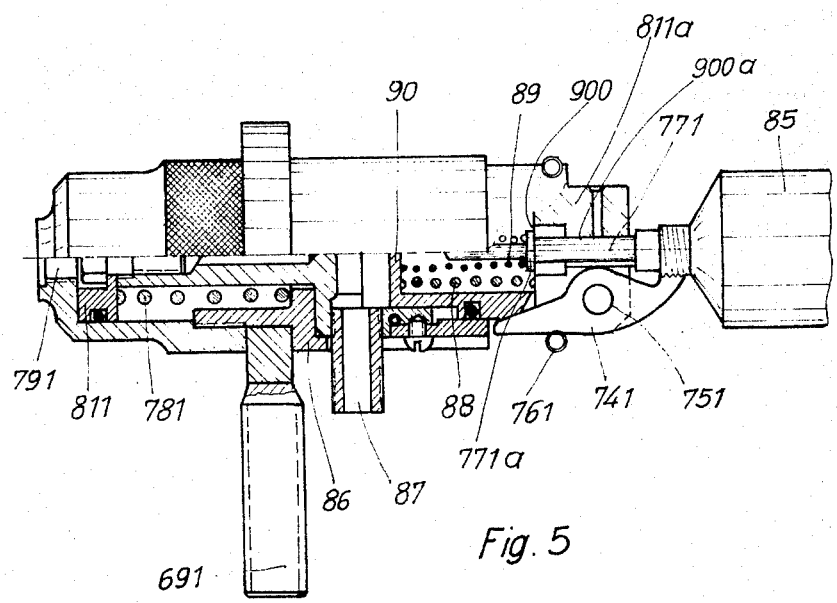
Figure 7:
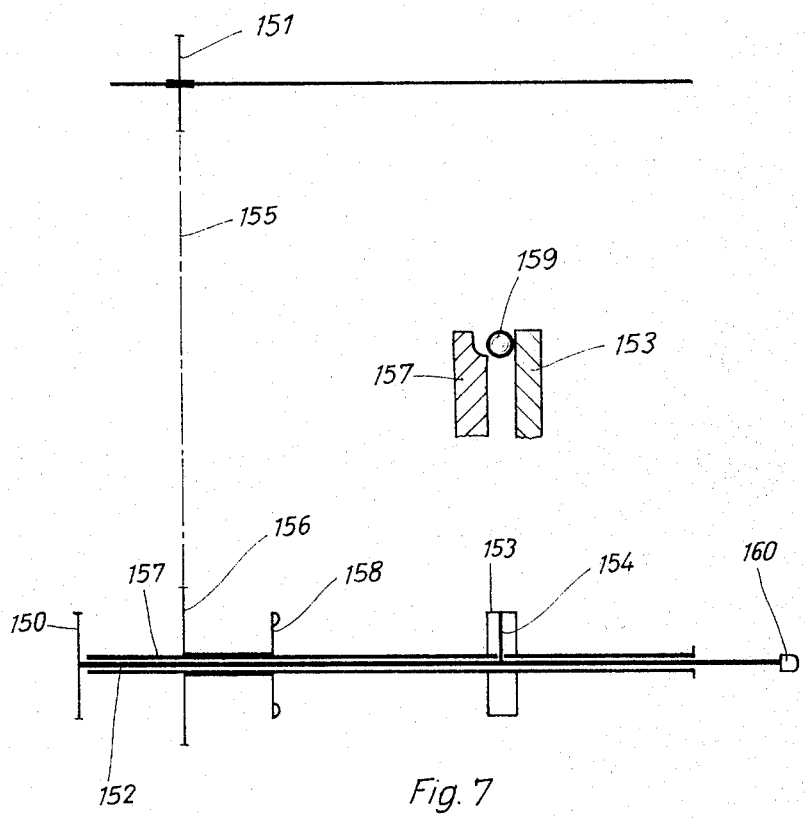

In the drawing there are illustrated various embodiments by way of example. It shows:

FIG. 1, the construction of an arrangement according to the invention in a diagrammatic representation, FIG. 1a, the work-piece holding head of an arrangement in accordance with the invention and the tool holder co-operating with it as well as the drive of the aforesaid parts in a side view in diagrammatic representation, FIG. 1b, the drive power path for the arrangement according to the invention in a plan view in diagrammatic representation, FIG. 2, the working station of an arrangement according to the invention and the transporting device auxiliary to this in a side view, FIG. 3, the working station of the second work unit of a two work unit arrangement according to the invention and the associated auxiliary transporting device for this in side view elevation in diagrammatic representation, FIG. 3a, the mandrel device for widening the tubes, sleeves or cans before their mounting on the conveyor chain in diagrammatic representation, FIG. 4, a gripping device for a transporting lever of an arrangement according to the invention intended for use with work-piece holding heads with hollow holding spindles in side elevation in vertical section, FIG. 4a, the device for the delivery of the tubes, sleeves or cans coming from the conveyor chain to the work-piece holding head of the working station of the second work unit of an arrangement according to the invention with two work units in side elevation in diagrammatic representation, FIG. 5, a second modified embodiment of the gripping device according to FIG. 4 which is for use with the work-piece holding heads with solid holding spindles, in side elevation and partly in axial section, FIG. 6, a control device of an arrangement according to the invention in side view in diagrammatic representation, FIG. 6a, the work-piece holding head of an arrangement according to the invention in diagrammatic representation in side elevation, in which the places are indicated at which there takes place the control of the correct working position of the work-piece spindles, and FIG. 7, an electrical speed regulating device for an arrangement in accordance with the invention with two work units, with the help of which the speeds of the movements of the transporting devices of both work units and of the conveyor chain can be balanced and synchronized.

In FIG. 1 of the drawing an embodiment by way of example is shown of a processing arrangement in accordance with the invention. This apparatus has two work units, of which each includes a work-piece holding head 2 and 8, and a tool holder 1 and 9. The auxiliary apparatus according to the invention with the mounting devices and the corresponding drives and controls are indicated by 3 and 7. The tubes, sleeves or cans to be made ready pass through, for example, initially the varnishing device 1, whence they are led through the drying oven with the help of the part 4 of the conveyor chain 4, 6 in order finally to be conveyed by the part 6 of the conveyor chain to the processing position at which they are subjected to the action of the printing machine 9. At the conclusion the tubes, sleeves or cans are again led through the drying oven 5 with the aid of the conveyor chain.

In FIG. 1a of the drawing the co-operation between a work-piece holding head 26 and the corresponding tool holder 25 is shown in more detail. The work-piece holding head is constructed in the form of a rotatable head and is rotatable about the shaft 26a. At its periphery there are distributed approximately equally spaced holding spindles 31, 31a, 31b, 32 and so on, on which the tubes, sleeves or cans are to be mounted in known manner. The holding head 26 can be moved stepwise forwards and backwards, for example, with the help of a Maltese cross or a Ferguson gear and so on, whereby the work-pieces to be processed are led one after the other to the processing position which according to the illustration of FIG. 1a is situated adjacent the spindle 32. At the processing position the work-pieces are presented for processing by the tool on the holder 25 rotatable about the axis 25a, which in the illustrated embodiment by way of example consists of a printing roll.

In FIG. 1b, 10 is the driving motor which drives the belt pulley 12 through the belt pulley 11 and the belt 1112, with which the chain-wheel 13 revolves, which is in operative connection through the chain 1319 with the chain-wheel 19, from which the drive for the rotatable head emanates. The chain-wheel 20 rotates with the chain-wheel 19, and corresponds to the chain-wheel 29 of FIG. 1a, while the wheel 19 of FIG. 1b corresponds to the wheel 28 of FIG. 1a. In FIG. 1a the wheel 27 corresponds to the wheel 13 of FIG. 1b and the connection 2728 to the connection 1319 of FIG. 1b. The chain 200, which corresponds to the chain 2930 in FIG. 1a, transmits the driving motion to the auxiliary apparatus according to the invention, see 3 and 7 in FIG. 1. The gear wheel 30 in FIG. 1a serves for the further transmission of this driving motion. The chain-wheel 13 is connected with the drive for the tool holder through the clutch 14, 15, which is controlled in the above described manner. Adjacent are two gear wheels, 16, 17, which transmit the drive power to the tool holder through gear 18.

The coupling interposed between the drive for the work-piece holding head and the drive for the tool holder can for example consist of an electro-magnetic coupling, which is electrically connected with the feeler member of the control device through a control relay, which automatically disconnects the drive for the half of the coupling associated with the tool holder, if the holder of the work-piece holding head arriving at the coating position contains no work-piece or has received this work-piece in its holder in an incorrect disposition for processing. There can also be interposed a mechanical coupling, which is in connection with the feeler member of the control device and a control relay which takes and passes on the impulse from this device through a pressure air cylinder with a piston guided therein, the coupling half associated with the drive of the tool holder being automatically engaged or disengaged corresponding to predetermined positions of the control device. Lastly a hydraulic or pneumatic coupling can be interposed in the above mentioned drives, which is controlled through the feeler member of the control device and a control relay taking and passing on the impulse from this. This feeler member can consist of an electrical contact member, of a light-senser operated on an optical-electrical principle or of a pneumatic feeler, which is composed of a nozzle providing a thin air stream feeling the position of the work-piece and a receiving funnel or lever serving for receiving this air stream and for passing on the control impulses. If the feeler establishes, shortly before the processing position, that the spindle of the passing work-piece holding head carries no tube, sleeve or can, it disengages the coupling, so that the tool holder under consideration stops, until the interruption is overcome or a spindle carrying a tube or can approaches the processing position. The work-piece holding head can be connected with the drive for the tool holder also through another connection element, which can disconnect the power at a predetermined time, for example through an over-running gear, a counter-shaft gear, a planet gear and so on.

Each mounting device contains a transporting lever, as is, for example, shown at 33 and 69. This lever is rotatably mounted approximately half-way between its ends (at 34 or 68) and carries at its one end (at 37 or 311b) a preferably pneumatically operated gripping device, which serves for gripping and releasing the work-piece to be processed. At its other end the lever is subject to the action of an actuating device 36 or 70, which consists of a piston guided in a pneumatic cylinder and imparts to it the pivoting movement about its pivotal axis in phase with the forward change-over movement of the work-piece holder head and in temporary synchronism with the movement of the conveyor chain. As is shown in FIG. 2 at 33a and in FIG. 3 at 69a, the transporting lever consists of two parts movably connected to one another, which are so adjustable relative to one another in a longitudinal direction and rotatable relative to one another, that the middle axis of the gripping device coincides exactly with the longitudinal middle axis of the corresponding holder spindle.

From FIG. 4 and 5 it is to be seen that each gripping device comprises a pressure air cylinder 81a or 811a with a piston 81 or 90 guided displaceably therein. At one end of the cylinder several, preferably three, clamping jaws 74 or 741 are provided advantageously lying equally spaced from one another, which are pivotably mounted at 75 or 751. Their outer gripping ends, whose inner sides can be toothed or corrugated for improving the ability to grip, pivot inwardly in an anti-clockwise direction on forward movement of the piston under the influence of the pressure medium introduced, for example, at 79 or 87, in order thus to engage and clamp the work-piece between them. By this means the piston co-operates for the time being with the inner side of an actuating end of a clamping jaw (see 80 in FIG. 4). On the outer side of the clamping jaws helical springs 76 or 761 are provided, which return the jaws to their initial position after the return movement of the piston. The piston 81 or 90 is displaced pneumatically against the action of the compression spring 78 or 88, 89 which returns it to the initial position after removal of the pressure medium. The admission and outflow of the pressure medium is controlled with the aid of a three-way valve, which is itself operated from a central operating and control device at predetermined instants. The gripping device carries moreover a co-axial ejector rod 77 or 771 mounted for to and fro movement in their longitudinal direction, which on the insertion if the grip of the work-piece to be processed is pushed into it (see FIG. 5) and on retraction of the piston is pushed out by the expansion compression spring and thus the work-piece is pushed out from between the jaws. As is to be appreciated from FIG. 4 and FIG. 5, the piston 81 or 90 is constructed as a hollow cylinder, which is closed at its face adjacent the pressure air inlet 79 or 87, while it has an opening or bore 810 or 900 at the other face, through which the one end of the ejector rod 77 or 771, which is displaceably mounted for to and fro movement within the piston, projects outwardly, in order to pass them through the corresponding wall at 810a or 900a of the piston guiding cylinder 81a or 811a at the side on which the clamping jaws are pivotally mounted on the cylinder. The air space between piston and cylinder is sealed with the aid of the packing 84. At the side remote from the jaws the guiding cylinder is closed by the cover 82, which is screwed to the cylinder at 83.

The gripping device embodiment shown in FIG. 4 is suitable for those cases in which the mounting spindles for holding the work-pieces are hollow inside. In this case the work-pieces, which are mounted loosely on the spindles, are in a manner of speaking "fired" axially with the aid of an axial pressure air stream directed through the hollow spindle, until they lie between the jaws of the gripping device, which then engage them. After rendering the jaws ineffective, the work-pieces are pushed off with the aid of the ejector rod and on to the new holder. If the mounting spindles are solid and the work-pieces cannot therefore be fired from the spindles, gripping devices according to the embodiment shown in FIG. 5 can be used. In this case the gripping device is mounted for to and fro movement in a longitudinal direction with its pressure-air connection 87 in a fixedly mounted housing 86 on the transporting lever 691. In this housing a piston 811 is guided which is fixedly connected to the gripping device, which is displaceable in the direction of the work-piece to be gripped under the action of the pressure medium admitted at 791, for example, pressure air and which, for example, with the aid of an opposing compression spring can be returned to the initial position. The axial movement corresponding to the "firing" of the work-piece from the spindle is effected in this case by the gripping device.

The compression spring 78 or 89 is disposed inside the piston and is supported on the one hand on the face of the piston adjacent the inside of the pressure air inlet and on the other hand on a collar 77a or 771a on the ejector rod.

Generally the apparatus is so arranged that the transporting lever or its gripping device before the commencement of its pivotal movement and before rendering effective the gripping device carries out a shifting movement in the direction of the pivotal axis of the lever towards the work-piece to be gripped and after rendering effective the gripping device a shifting movement in the opposite direction, while on the completion of the pivoting movement of the transporting lever with a still operational gripping device an axial shifting movement is effected in the direction towards the holder, on which the work-piece is mounted, and after rendering the gripping device ineffective an oppositely directed movement is carried out. In order to shorten the shifting movement of the lever and thus to economise on time and pressure medium, there is arranged for the transporting lever an intermediate position between the initial position and the forward displacement position in the region of the work-piece to be gripped. The transporting lever moves forward to the forward displacement position before the rendering effective of the gripping device and backwards to the intermediate position after the rendering effective of the gripping device, in order, after the pivotal movement by the still effective gripping device, to aagin proceed to the forward displacement position, from which it next returns to the intermediate position and only finally to the initial position.

In place of the gripping device the transporting lever can also be constructed as a pneumatically operable vacuum pump, which likewise serves for engaging the work-piece to be processed.

As is to be appreciated from FIG. 2, the tubes, sleeves or cans 41 to be processed arrive on the inclined plane 38 in order to be transferred with the aid of the piston guided in the pressure air cylinder 41a into the holding member 42, from which they are transferred in a known manner, for example, by a pneumatic or mechanical method, to the work-piece holders on the work-piece holder head 25 constructed as spindles. After completion of the processing with the aid of the tool holder the work-pieces are removed by the lever 33 from the spindles 31a, 31b and so on, as is shown at 37, and are mounted on the chain 39, which conveys them to the drying oven.

With two working units arranged in series the work-pieces arriving on the conveyor chain from the post-processing and post-treatment station of the first working unit are removed from the holding rods which are shown in the chain in FIG. 3 at 61, for example with the aid of pressure air. They are thereby collected in a compartment 67 of a rotatable drum with several compartments in star-like disposition. After rotation of the drum about a suitable angular path the work-pieces are fed over an inclined plane 711 with the aid of the pressure air cylinder 722 into the receiving channel 72, which, for example, can have a prismatic cross-section and consists of adjacent rollers lying parallel to one another and which preferably is adjustable in order to obtain a central disposition of the work-pieces. From the receiving channel the workpieces are pushed after a reversal of about 180° onto the holder spindles 311, 311a, 311b and so on of the work-piece holding head 251 mounted at 251a. A pusher element 104 (FIG. 4a) serves for the pushing of the work-pieces 105, which is secured to a rod 101 of a piston 100 guided in a pressure air cylinder 99 parallel to the piston rod and under the influence of an intermediate part 102 lying at right angles to it, which is mounted for to and fro movement with the piston-rod on a rod-like slide bar 103 and on which the opposite end of the displacement member at 104 is, for additional security against rotation, guided on the surface 100a.

Before the pushing of the work-piece onto the holding spindles of the work-piece holding head the setting-up ends of the work-pieces are widened in the manner shown in FIG. 3a. A conical preferably pneumatically-operated widening mandrel 94 is introduced into the setting-up ends 98 of the work-piece 97 as indicated by the arrow 941, in conjunction with which there is resistance at the opposite end at 95, 96.

For the control of the correct working position of the work-piece on the holding spindle at any given time a template 22 as shown in FIG. 6 is provided, which has an inner contour corresponding to the outer contour of the work-piece 21 and on inexact positioning or poor disposition of the work-piece on its spindle brings into operation a relay through the conductors 23, 24, which switches off the apparatus and, for example, also gives rise to an optical or acoustic warning signal. The work-pieces gripped on the work-piece holding head 255 pass approximately at 91 under the template 22, whereafter at 92 the electrical control device controlling the coupling for the drive for the tool holder examines with its feeler member whether the holder under consideration shortly before the arrival at the processing position 93 really contains a work-piece (FIG. 6a).

For processing devices with a single working unit on the one hand the driving movement for the tool holder and on the other hand the driving movement for the conveyor chain and for the auxiliary mounting and transporting devices are derived from the directly driven work-piece holding head. For two series connected working units the work-piece holder heads are driven directly from an associated driving motor. From the thus transmitted power flow the driving movement for the tool holder is derived in the above-described manner. The conveyor chain common to all stations of both working units receives its working movement in this case from the power flow leading to the work-piece holding head of the second working unit. The impulses for the individual intermittently occurring control movements of the various parts of the plant, for example, the pressure air cylinders for the control of the pivotal movements of the transporting levers, the valves controlling the pressure air admission and outflow to and from the gripping devices and so on, proceed from a control shaft 48 or 59, which rotates in synchronism with the conveyor chain and is connected with those parts, for example, through a chain or belt drive. On the control shaft there are mounted various cams associated with the individual movements to be controlled, which produce the control impulses through suitable intermediate elements.

As well in the apparatus according to FIG. 2 as also in the apparatus according to FIG. 3 the portion 39 or 61 of the conveyor chain carrying the picked-up work-piece reverses direction in the working region of the gripping device of the transporting lever about a reversing and tensioning roller 45 or 66, which during the displacement movement of the transporting lever serving for the setting up of the work-piece has imparted to it compensation movement on an orbital path opposed to the direction of movement of the conveyor chain and by this means the holding spindle for the mounting of the momentarily present work-piece is held in place in spite of the continuous movement of the conveyor chain until the work-piece is mounted by means of the transporting lever on the holding spindle of the conveyor chain. By this synchronisation of, and compensation between, the continuous movement of the conveyor chain on the one hand and the intermittent movement of the transporting chain on the other hand it is ensured that at the instant of the mounting of the work-pieces on the conveyor chain no relative movement can take place between the transporting lever and the rod or pin on the conveyor chain serving for receiving the work-piece, since by this means damage to the transporting lever or the conveyor chain could result. For the above-mentioned purpose the end of the conveyor chain co-operating with the transporting lever of the auxiliary transporting device under consideration is curved to a substantially L-form with the aid of three reversing and tensioning rollers 43, 44, 45 or 64, 65, 66, the portion of the chain which carries the work-piece to be mounted being disposed approximately at the point of the lower limb of the L. The reversing and tensioning roller 45 or 66 is arranged at one end of a balancing or compensating lever 4445 or 6566, which at its other end is pivotally mounted at 44a or 65a and which is given the pivotal movement imparted by a control cam 53 or 60, which rotates in synchronism with the conveyor chain and the cam part of which at controlled time intervals communicates the pivotal movement, for example, through a sliding roller (FIG. 3) or through the angled part 120 (FIG. 2) to the lever. After completion of its balancing or compensating movement the reversing and tensioning rollers effect a return movement in the opposite direction at double speed. In the arrangement shown in FIG. 3, which is provided with a base 511 adjustable with the aid of the hand wheel 541, the driving power is transmitted from the tool holding head to the wheel 56, in order from there to be transmitted to the conveyor chain 61 through the wheel 57. Chain 61 moves as indicated by the arrow 62 and is wound around the rollers 63, 67, 64, 66, 65. The connection between the wheels 56 and 57 is effected through the transmission element 5657. The wheel 55 coaxial with the wheel 56 drives the wheel 59, cam wheel 60. The wheel 59 is mounted on the control shaft of the arrangement, and the cam wheel 60 is made in one piece with the above-mentioned control cam. 58 is a chain-tensioning roller for the chain 5560. In the embodiment according to FIG. 2 the conveyor chain 39 passes around the wheels 44, 45, 43. The driving power from the work-piece holder is transmitted to the wheel 46 from which it passes to the wheel 48 (over the chain tensioning roller 47) and to the wheel 53 rotating with the cam wheel 53 through the chain 4647. 48 is associated with the control shaft of the corresponding arrangement. The drive of the conveyor chain is effected in this case from the mounting and transporting device (see FIG. 3) of the associated second working unit. The mounting and transporting device for the first working unit (FIG. 2) is arranged similarly to the device for the second unit on a base 51, which is adjustable with the aid of the hand wheel 54.

In embodiments with two working units, as in the example illustrated in the drawing, a ratchet 52 rotates synchronously with the control cam 53, which is connected with the chain wheel 50, which is driven by the conveyor chain 39, which runs in the direction of the arrow 40, through the wheel 43a and the chain 4350. The ratchet co-operates with a pawl 521, which is mounted on an end of a transmitting member 5211 connected with the end of the balancing lever 4445 remote from the pivot of the balancing lever and in connection with ratchet teeth of the ratchet blocking a movement of the pawl relative to the ratchet wheel against the direction of movement of the conveyor chain equalizes the possible differences between the speeds of movement of the work-piece holding heads of both working units. Since the driving motors for both working units hardly ever rotate at exactly the same speed and the conveyor chain common to both working units is driven from the second working unit, the speeds of the transporting device of the first unit and the speed of the conveyor chain must be made to correspond with one another, which is effected with the aid of the ratchet 52. The ratchet has for this purpose as many ratchet teeth as the chain wheel 43 is divided into chain elements, so that a unit of ratchet travel corresponds to a chain element division. With the aid of the above described arrangement the lever 4445 obtains a movement opposed to the conveyor chain movement and at a speed corresponding to the speed of the conveyor. The return of the lever to the initial position is thereby effected with equalization or compensation of eventual differences between the speed of the conveyor chain and that of the transporting device.

For processing devices with the two series arranged working units in place of the above described controlling arrangement with a ratchet, an electrical controlling arrangement can be used, which serves to mutually equalize the speeds of both working units at the point at which the transporting device of the first working unit enters into co-operative relationship with the conveyor chain running with the speed of the second unit. For this purpose a connection is established through discs and cams between the drive for the first working unit, which is illustrated schematically in FIG. 7 at 150, and the drive for the second working unit, indicated at 151, which on a difference in speed arising between the two drives closes or opens a switch contact and by this means, according to the difference in speed, switches resistances in or out and equalizes the two speeds. The shaft 152 is fast with the driving wheel 150, on which is mounted the control disc 153 constructed as a disc clutch, which is connected to it through the rod 154. The driving wheel 151 drives the wheel 156 through the chain 155, which wheel 156 is mounted on the hollow shaft 157 and is fast with the control disc 158. Both control discs 153 and 158 are so provided on their sides facing one another with curves and cam that they rotate with one another at the same speeds without changing their relative axial spacing. On speed differences arising they repulse one another through the balls or rollers 159, so that they carry out with respect to one another an axial displacement and thereby actuate the contact 160, whereby, for example, an additional resistance can be switched in. If for example the speed of the first unit is higher than that of the second unit, this higher speed is reduced by the switching in of the additional resistance, until both speeds are again substantially equal to one another. In this case both control wheels are drawn together, for example, under the action of a spring, so that the contact opens and the additional resistance is switched out. It is thereby achieved, that the speeds of both units vary about an intermediate value. Obviously the arrangement can be inverted, in which the driving wheel 150 drives the hollow shaft 157 and the driving wheel 151 the shaft 152.

Although my invention has been illustrated and described with reference to the preferred embodiments thereof, I wish to have it understood that it is in no way limited to the details of such embodiments, but is capable of numerous modifications within the scope of the appended claims:

Having thus fully disclosed my invention, what I claim is:

1. Processing apparatus for the non-cutting processing of work-pieces in continuous flow, comprising a working unit including in combination; at least one processing station for the transfer of a fluent material to the peripheral surface of the work-piece to be processed; a tool at said processing station; a tool holder carrying said tool and drive means for moving said tool holder in forward and reverse direction; a work-piece holding head having holders thereon adapted to carry simultaneously several work-pieces distributed on its periphery, said work-piece holding head being movable in discrete change-over steps to bring said work-pieces on its periphery one after the other into the processing position and there present them to said tool on said tool-holder for performing the respective processing operation; a drive motor for said work-piece holding head connected therewith; coupling means between the drives of said work-piece holding head and said tool-holder, means for uncoupling said coupling means for interrupting the power connection between said drive motor and said tool-holder at a predetermined time while maintaining a connection between said drive motor and said head; a control device for detecting the correct working position of the work pieces on the work-piece holding head; a feeler member within said control device for performing said control operation, means connecting said coupling and uncoupling means to said feeler member of said control device to couple or uncouple said tool-holder from said holding head in response to impulses generated by said control device in dependence upon whether the holder approaching the processing station contains a work-piece and whether this work-piece has taken up in its holder the correct working position.

2. The processing apparatus set forth in claim 1, wherein a post-processing station is provided beyond said processing station, and chain means connecting said post-processing station and said processing station.

3. The processing apparatus set forth in claim 1, including a conveyor device, a transfer device for transferring the work-pieces from said work-piece holding head to said conveyor device, means for operating said transfer device in temporary synchronism with the forward movement of said work-piece holding head, of the conveyor device and of the tool-holder, said transfer device with the control device and synchronizing means constituting an auxiliary apparatus detachably mounted on said work-piece holding head and said tool holder.

4. In the processing apparatus set forth in claim 3, a second working unit comprising processing, post-processing and treatment stations connected behind the post-processing and treatment station of the first working unit, a conveyor chain for transporting the work-piece between the first and the second working units, a second auxiliary detachable device which belongs to the second working unit, means to produce operation of said second auxiliary device in phase with the forward movement of the associated work-piece holding head of the first working unit and in temporary dependence upon the movement of the conveyor chain, and means for mounting the work-piece being processed after automatic removal from the work-piece holding head on the conveyor chain.

5. The processing apparatus set forth in claim 4, wherein each mounting means includes a transporting lever pivotally mounted approximately in the middle between its ends, a gripping device at one end of said lever for gripping and releasing the work-pieces to be processed and an actuating means connected to the other end of the lever which imparts to it a pivotal movement about its pivotal axis in phase with the movement of the work-piece holding head and in temporary synchronism with the movement of the conveyor chain.

6. In the processing apparatus set forth in claim 5, means to impart to a part of the mounting means before the commencement of the pivoting movement of the lever and before the rendering effective of the gripping device a displacement movement in the direction of the pivotal axis of the lever towards the work-piece to be gripped up to a displaced position and to impart to the mounting means after the rendering effective of the gripping device a displacement movement in the opposite direction, at least up to an intermediate position lying in the direction of movement before the initial position, and for thereafter, after completion of the pivotal movement of the transporting lever with the gripping device still effective, to impart to the mounting means an axial displacement movement in the direction towards the holder for the work-piece again into the forward position and for effecting after rendering ineffective the gripping device an oppositely directed movement up to the initial position.

7. The processing apparatus set forth in claim 6, wherein each gripping device includes a pressure air cylinder with a piston movable to and fro therein, a plurality of clamping jaws pivotally arranged on one end of said cylinder, means responsive to forward movement of the piston under the influence of a pressure medium to project the outer gripping ends of the gripping jaws inwardly so that the work-pieces are engaged and tightly clamped between them.

8. The processing apparatus set forth in claim 7, the clamping jaws being pivoted in the middle between their ends and the actuation ends remote from the gripping ends engaging the piston on their inner sides, a compression spring against which the piston is movable pneumatically, and a helical spring engaging the jaws for returning the jaws to non-gripping position after the return movement of the piston to its initial position.

9. The processing apparatus set forth in claim 8, wherein the gripping device carries an ejector rod coaxial with it, a casing fixedly secured to the transporting lever, means mounting the gripping device in said casing for to and fro movement in a longitudinal direction, a second piston secured to the gripping device guided in said casing and displaceable therein under the action of a pressure medium towards the work-piece to be gripped, and spring means for returning the second piston to its initial position.

10. The processing apparatus set forth in claim 5, wherein the transporting lever carries at one end a pneumatically operated vacuum means serving for gripping the work-piece to be processed.

11. The processing apparatus set forth in claim 4, said conveyor claim having holding rods thereon, means to remove work-pieces arriving on the conveyor chain at the post-processing and post-treatment station of the first working unit from the holding rods of the chain, a collecting trough for receiving work-pieces from the removing means, the work-piece holding head having spindles thereon, and means to push the work-pieces from the collecting trough after a rotation through approximately 180° onto the holding spindles.

12. The processing apparatus set forth in claim 11, wherein the work-pieces removed from the conveyor chain are collected in a compartment of a rotatable drum with several compartments in a star-like arrangement for receiving the work-pieces removed from the conveyor chain, and means to discharge the work-pieces after rotation of the drum through an angular path into the collecting trough, said discharge means including an inclined plane.

13. The processing apparatus set forth in claim 1, wherein said control device includes a template for the control of the correct working position of the work-piece on the holding head, said template having an inner contour corresponding to the outer contour of the work-piece, relay means responsive to an inexact positioning or poor seating of the work-piece.

14. The processing apparatus set forth in claim 3, with a single working unit, means for directly driving the work-piece holding head, and means to transmit the driving motion of the holding head to the tool holder, to the conveyor chain and to the auxiliary mounting and transfer devices.

15. The processing apparatus set forth in claim 1, with two working units in series, a motor connected to said holding heads for driving them directly, means to transmit the motion of the holding heads to the tool holder, a conveyor chain common to all of the stations of both working units, and means to transmit to said conveyor chain the motion from the work-piece holding head of the second working unit.

16. The processing apparatus set forth in claim 5, means to guide the portion of the conveyor chain carrying the work-piece to be picked up in an L-form in the operating region of the gripping device of the transporting lever including at least one reversing and tensioning roller, means mounting said roller to undergo, during the displacement movement of the transporting lever for the mounting of the work-pieces, an equalizing movement on an orbital path opposed to the direction of movement of the conveyor chain and with the forward speed of the conveyor chain to maintain the holding spindle in place for the mounting of the work-piece in spite of the continuous forward movement of the conveyor chain.

17. The processing apparatus set forth in claim 16, with two working units arranged in series, a cam in the first working unit for moving said roller mounting means, a ratchet rotating synchronously with the cam, a pivot for said roller mounting means, a transferring member connected with the roller mounting means remote from the pivot thereof, a pawl carried by said transferring member engaging the teeth of the ratchet wheel to block movement of the pawl relative to the ratchet wheel against the direction of movement of the conveyor chain, as to equalize possible differences between the speeds of movement of the work-piece holding heads of both working units.

18. The processing apparatus set forth in claim 1, with two working units arranged in series, a resistance controlling one of the drives, curve and cam means connecting the drive for the first working unit and the drive for the second working unit responsive to speed differences between both drives to vary the resistance to maintain both speeds substantially equal with one another.

19. The processing appaartus set forth in claim 18, said curve and cam means comprising two parallel control discs lying opposite one another, one rotating with each of said drives and provided with cams and curves corresponding to one another on opposing sides at a predetermined angular position with relation to the axis of rotation, which on speed differences arising between them are axially displaced from one another.

References Cited by the Examiner
UNITED STATES PATENTS

| | | | |
|---|---|---|---|
| 2,255,308 | 9/1941 | Biner | 156—357 |
| 2,762,329 | 9/1956 | Arelt | 118—2 |

EARL M. BERGERT, *Primary Examiner.*

R. H. CRISS, *Assistant Examiner.*